Figure 3:
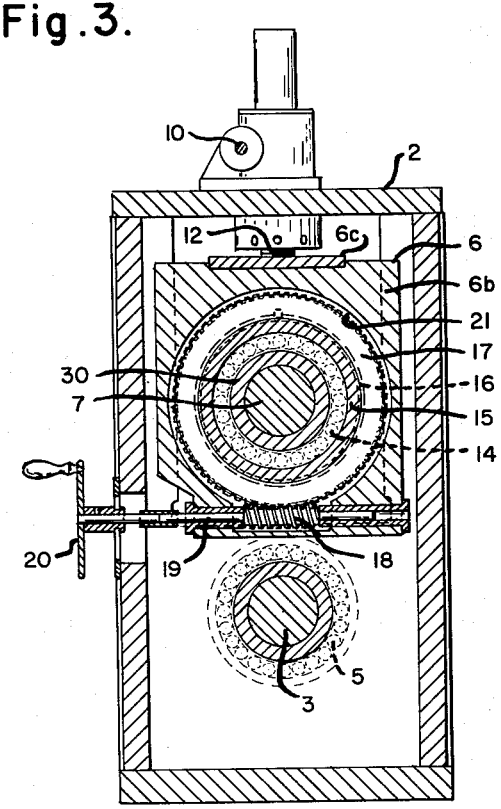

June 28, 1966  R. B. JONES  3,257,887
VERTICALLY AND AXIALLY ADJUSTABLE BLADE
FOR A ROTARY SIDE TRIMMER
Filed Nov. 30, 1964  2 Sheets-Sheet 1
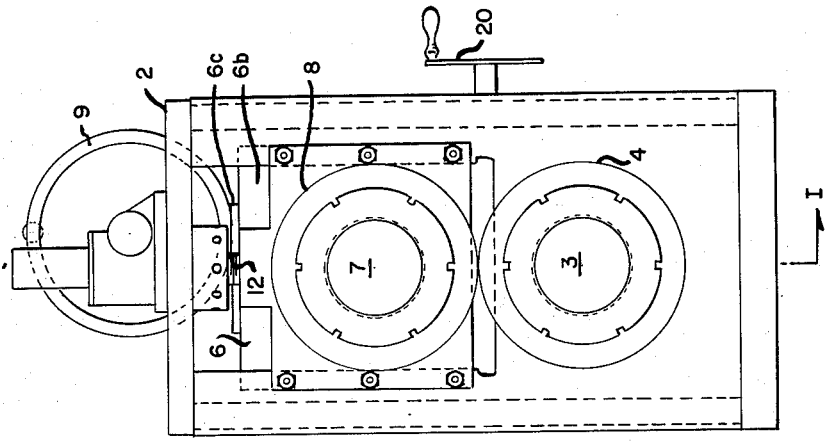
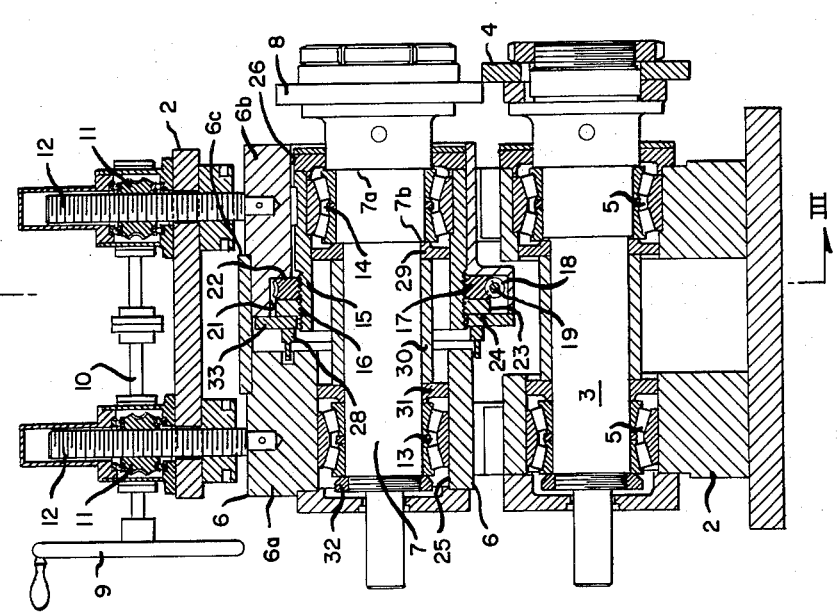
INVENTOR
Robert B. Jones

United States Patent Office 3,257,887
Patented June 28, 1966

3,257,887
VERTICALLY AND AXIALLY ADJUSTABLE
BLADE FOR A ROTARY SIDE TRIMMER
Robert B. Jones, Port Washington, Ohio, assignor to The
Wean Engineering Company, Inc., Warren, Ohio, a
corporation of Ohio
Filed Nov. 30, 1964, Ser. No. 414,672
7 Claims. (Cl. 83—503)

This invention relates to side trimmers such as are employed in continuous strip lines which comprise coacting side trimmer knives for edge trimming strip passing through the line.

Due to grinding of the side trimmer knives which changes their diameter and width it is necessary to relatively adjust both vertically and axially the arbors which carry the knives. Heretofore vertical adjustment has been accomplished by means of a hand wheel and screw arrangement connected with the top arbor whereby the top arbor is raised and lowered, while axial adjustment has been accomplished by means including a nut on the end of the bottom arbor opposite the end at which the bottom trimmer knife is disposed. Such arrangement has been disadvantageous because requiring adjusting means to be associated with both arbors and also because the axial adjustment of the bottom arbor at the end thereof opposite the end at which the bottom trimmer knife is disposed results in the entire length of the arbor being interposed between the point of adjustment and the bottom trimmer knife so that expansion and contraction of the arbor due to temperature changes causes a maximum of maladjustment which must be eliminated by horizontal or axial adjustment of the arbor from time to time.

I have devised a side trimmer obviating the disadvantages of the prior structures. I provide for effecting all adjustments in a single arbor so that the other arbor may be nonadjustably mounted. I find it desirable to effect the adjustments in the upper arbor. Vertical adjustment is accomplished in the same manner as previously but axial adjustment is accomplished differently and so that loss of adjustment of the trimmer knives due to temperature changes is minimized.

I provide a side trimmer comprising a housing, a first arbor carrying a side trimmer knife rotatably mounted in the housing, a mounting structure carried by the housing, a second arbor carrying a side trimmer knife for coaction with the first mentioned side trimmer knife, said second arbor being rotatably mounted in the mounting structure, means for adjustably moving the mounting structure vertically in the housing and means for adjustably moving the second arbor axially in the mounting structure. Preferably the second arbor is rotatably mounted in axially spaced bearings, the mounting structure having an axial guideway in which such bearings are adjustably movable to adjustably move the second arbor axially in the mounting structure. Means are preferably provided which move the bearing closer to the trimmer knife carried by the second arbor in the guideway to axially adjust the second arbor, the other bearing moving freely in the guideway.

I desirably employ a manually turnable shaft mounted in the mounting structure and provide connections between such shaft and the first mentioned bearing above referred to for moving that bearing in the guideway upon turning of the shaft. The connections may include a worm on the shaft, a worm wheel meshing with the worm and means actuated upon turning of the worm wheel for moving the first mentioned bearing in the guideway.

In a preferred structure I employ an externally threaded generally cylindrical carrier carrying the first mentioned bearing above referred to, and an internal gear which meshes with the externally threaded carrier for axially moving the carrier and with it the first mentioned bearing upon turning of the internal gear, the worm wheel being connected to the internal gear to turn the internal gear upon turning of the worm wheel. The worm wheel may be integral with the internal gear.

Other details, objects and advantages of the invention will become apparent as the following description of a present preferred embodiment thereof proceeds.

In the accompanying drawings I have shown a present preferred embodiment of the invention in which FIGURE 1 is a central vertical cross-sectional view through a side trimmer embodying my invention, the cross section being taken on the line I—I of FIGURE 2;

FIGURE 2 is a side view of the side trimmer shown in FIGURE 1 as viewed from the right-hand side of FIGURE 1; and FIGURE 3 is a vertical cross-sectional view taken on the line III—III of FIGURE 1.

Referring now more particularly to the drawings, there is provided a housing designated generally by reference numeral 2 in which is nonadjustably mounted for rotation a first or bottom arbor 3 carrying a first or bottom side trimmer knife 4. The arbor and knife and the mounting of the knife on the arbor may be conventional and hence are not described in detail. The arbor 3 is mounted for rotation in axially spaced apart bearings 5 mounted in the housing 2.

Mounted in the housing 2 for adjustable vertical movement therein is a mounting structure 6 including left-hand and right-hand elements 6a and 6b respectively, viewing FIGURE 1, connected and in effect made integral by a plate 6c. The mounting structure 6 carries the second or upper arbor 7 which in turn carries the second or upper side trimmer knife 8 which coacts with the knife 4 to edge trim material passing through the side trimmer. The mounting structure 6 and hence the arbor 7 and knife 8 are vertically adjusted in the housing 2 by conventional means including a hand wheel 9 for turning a shaft 10 carrying worms meshing with worm wheel nuts 11 which are internally threaded and mesh with screws 12 which are connected with the tops of the respective elements 6a and 6b of the mounting structure 6 and extend upwardly therefrom.

As indicated above I provide for axially adjusting the upper arbor 7 which is the same arbor which is vertically adjusted. The upper arbor 7 is mounted for rotation in bearings 13 and 70. The bearing 13 is mounted for axial movement in a guideway 25 in the element 6a of the mounting structure 6. The bearing 14 is fixedly mounted as shown in FIGURE 1 in a generally cylindrical carrier 15 adapted for axial movement in a guideway 26 in the element 6b of the mounting structure 6 to adjust the knife 8 by axial movement of the bearing 14. The axes of the guideways 25 and 26 are parallel so that they in effect constitute a single guideway. The arbor 7 has a shoulder 7a engaging the inner race of the bearing 14 and a shoulder 7b engaging a collar 29 which in turn is engaged by a sleeve 30 which engages a collar 31 engaging the inner race of the bearing 13. A nut 32 is threaded onto the arbor 7 and is tightened against the inner race of the bearing 13 as shown in FIGURE 1. Thus the inner races of the bearings 13 and 14, the collars 29 and 31 and the sleeve 30 and of course the nut 32 rotate with the arbor 7.

The generally cylindrical carrier 15 has its lefthand end externally threaded as shown at 16 in FIGURE 1. A combined worm wheel and internal gear 17 meshes with the threads 16 and is adapted to be turned by a worm 18 on a shaft 19 carrying a hand wheel 20. The combined worm wheel and internal gear 17 is disposed in a radial groove 21 in the element 6b of the mounting structure 6 with its right-hand face viewing FIGURE 1 against a face 22 of the element 6b. A filler ring 23 is interposed between the member 17 and an opposed face 24 of a plate 33 forming part of the element 6b. Thus when the hand wheel 20 is turned it turns the worm 18 which turns the combined worm wheel and internal gear 17 which causes the carrier 15 to move axially since the carrier is keyed to the mounting structure 6 and hence cannot rotate. But the bearing 14 is, as clearly shown in FIGURE 1, mounted in the carrier 15 so that the bearing moves axially with the arbor 7. Further, the arbor 7, as also clearly shown in FIGURE 1, is constrained to move axially with the bearing 14 so that turning of the hand wheel 20 results in adjustably positioning the arbor 7 and the knife 8 axially in relation to the arbor 3 and the knife 4.

The axial adjustment of the arbor 7 is effected at the bearing 14 as above described which is close to the knife 8, minimizing the effect of expansion and contraction due to temperature changes on the adjustment of the knives. Any expansion or contraction occurring in the arbor 7 to the left of the bearing 14 viewing FIGURE 1 has no effect upon the adjustment of the knives but simply results in some axial movement of the bearing 13 which is free to move in the guideway 25. The element 6b has an annular projection 28 cooperating with the element 6a as shown in FIGURE 1 acting somewhat in the nature of a seal to exclude foreign matter.

While I have shown and described a present preferred embodiment of the invention it is to be distinctly understood that the invention is not limited thereto but may be otherwise variously embodied within the scope of the following claims.

I claim:

1. A side trimmer comprising a housing, a first arbor carrying a side trimmer knife rotatably mounted in the housing, a mounting structure carried by the housing, a second arbor carrying a side trimmer knife for coaction with the first mentioned side trimmer knife, said second arbor being rotatably mounted in the mounting structure, means for adjustably moving the mounting structure vertically in the housing and means for adjustably moving the second arbor axially in the mounting structure.

2. A side trimmer as claimed in claim 1 in which the second arbor is rotatably mounted in axially spaced bearings, the mounting structure having an axial guideway in which such bearings are adjustably movable to adjustably move the second arbor axially in the mounting structure.

3. A side trimmer as claimed in claim 2 in which means are provided which move the bearing closer to the trimmer knife carried by the first arbor in the guideway to axially adjust the second arbor, the other bearing moving freely in the guideway.

4. A side trimmer as claimed in claim 3 in which a manually turnable shaft is mounted in the mounting structure and connections are provided between such shaft and the first mentioned bearing for moving that bearing in the guideway upon turning of the shaft.

5. A side trimmer as claimed in claim 4 in which such connections include a worm on the shaft, a worm wheel meshing with the worm and means actuated upon turning of the worm wheel for moving the first mentioned bearing in the guideway.

6. A slide trimmer as claimed in claim 5 in which an externally threaded generally cylindrical carrier is provided which carries the first mentioned bearing, an internal gear meshes with the externally threaded carrier for axially moving the carrier and with it the first mentioned bearing upon turning of the internal gear and the worm wheel is connected to the internal gear to turn the internal gear upon turning of the worm wheel.

7. A side trimmer as claimed in claim 6 in which the worm wheel is integral with the internal gear.

No references cited.

WILLIAM W. DYER, Jr., *Primary Examiner.*

L. B. TAYLOR, *Assistant Examiner.*